Feb. 4, 1969  C. F. SHELTON, JR  3,425,865
INSULATED CONDUCTOR
Filed June 29, 1965
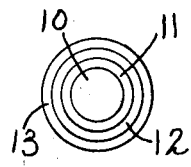
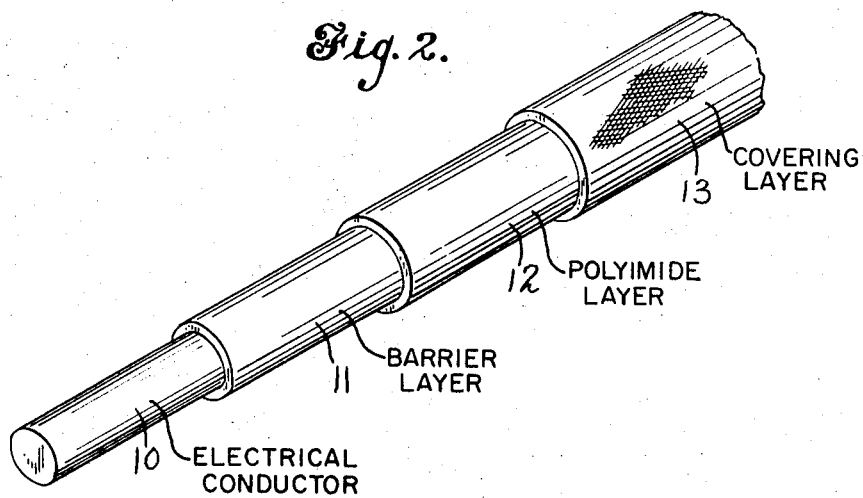
INVENTOR
Charles F. Shelton, Jr.
BY DeLio and Montgomery
ATTORNEYS

United States Patent Office 3,425,865
Patented Feb. 4, 1969

3,425,865
INSULATED CONDUCTOR
Charles F. Shelton, Jr., Branford, Conn., assignor to Cerro Corporation, New York, N.Y., a corporation of New York
Filed June 29, 1965, Ser. No. 467,907
U.S. Cl. 117—218                                              6 Claims
Int. Cl. H01b 3/00

ABSTRACT OF THE DISCLOSURE

This invention is directed to a lightweight, small-diameter, abrasion-resistant, insulated electrical wire capable of withstanding service at temperatures above 650° F. and in a direct open flame at temperatures above 1000° F. The insulated electrical wire comprises a conductor, covered with a barrier layer which in turn is covered with a layer of polyimide.

---

This invention relates to electrical wire and cable and more particularly to insulated electrical wire exhibiting improved radiation, flame and abrasion resistant properties.

Over the past several years there has been a widespread demand for small-diameter, abrasion-resistant, lightweight wire, capable of withstanding service at elevated temperatures, above 650° F. and in an open and direct flame at temperatures above 1000° F.

In attempting to meet these demands, various wire constructions have been suggested. For example, Teflon-glass insulated wire and Teflon-polyimide insulated wire have been employed by the prior art. However, at elevated temperatures, above 650° F., rapid decomposition of Teflon insulated wire begins to occur. In open flame environments and at temperatures greater than 1000° F., Teflon insulation decomposes in approximately one minute, even though the Teflon itself is not directly exposed to the open flame. As such, Teflon insulated wire has not met the demands for an abrasion-resistant wire capable of maintaining circuit integrity either at elevated temperatures or under open flame conditions.

To meet the demand for a wire having a high degree of abrasion resistance and capable of usage at both elevated temperatures and in an open flame for prolonged periods of time, applicant has provided a new and improved combination of elements in a new form of insulated wire.

In view of the foregoing, it is an object of this invention to provide a new insulated wire having new and improved temperature resistance properties, flame resistance properties and abrasion resistance properties.

Another object of this invention is to provide a new and improved insulated wire having an inorganic flame-resistant insulated layer directly in contact with the metallic conductor.

Another object of this invention is to provide a new and improved flame-resistant insulated wire, said insulated wire comprising a metallic conductor covered with a first layer of inorganic substantially flame-resistant material which is, in turn, covered with a polyimide abrasion and temperature resistant material.

Still other objects and advantages of the invention will in part be obvious and will in part be apparent from the specification.

The invention accordingly comprises an article of manufacture possessing the features, properties and relation of elements which will be exemplified in the article hereinafter described and the scope of the invention will be indicated in the claims.

For a fuller understanding of the nature and objects of the invention reference is had to the following description taken in conjunction with the accompanying drawing, in which the same reference numerals designate like or corresponding parts in the several views and in which:

FIG. 1 is an enlarged cross-sectional view of the insulated wire in accordance with the invention; and FIG. 2 is a perspective view of the insulated wire according to the invention, with successive layers cut away to show the structure.

Referring to FIGS. 1 and 2, the insulated conductor or wire according to this invention includes a metallic conductor 10, preferably of a stranded nickel-plated copper material. It is to be understood that any other conventional metallic conductor can also be employed, e.g., copper, silver, silver-plated copper or conductive alloys, e.g., stainless steel.

Directly over the metallic conductor 10, a layer 11 of inorganic barrier material is applied. In the preferred embodiment a woven glass tape reinforced with mica bonded to it by a silicone resin adhesive is utilized. It is to be understood that other inorganic materials such as glass, quartz, mica, quartz-supported mica or asbestos could also be utilized. The layer 11 may be extruded, applied as tape or film, or in any other conventional manner.

Over the layer 11 there is next applied a polyimide layer 12 which is utilized as an abrasion-protective layer as well as the primary dielectric layer. The polyimide layer 12 may be applied as a tape, a coating, a thread which is wound to form the layer, or in any other suitable manner. Polyimides preferred are those resulting from the polycondensation reaction between an aromatic tetrabasic acid such as a pyromellitic dianhydride and an aromatic diamine, to provide a [polypromellitimide]. An example of such a polypyromellitimide is disclosed in the publication "Chemical and Engineering News," Apr. 13, 1964, pages 55 to 57. In that article a polyimide film—[N,N'-(BP'-oxydiphenylene) pyromellitimide] was prepared by the reaction of pyromellitic dianhydride and bis (4-aminophenyl) ether. In a typical preparation, equivalent amounts of bis (4-aminophenyl) ether and pyromellitic dianhydride are stirred together for one hour at room temperature in dimethylacetamide. The polyamic acid solution is then spread onto dry glass plates and dried under nitrogen for 20 minutes at 80° C. The films that form are then further dried under vacuum at room temperature. When the solid level reaches 70%, the films are heated in a forced-draft oven at 300° C. for one hour to convert the acid to the high-molecular weight polyimide. The entire disclosure of the "Chemical and Engineering News" article, above-noted, is incorporated in this application by reference hereto.

Additional polyimides which are preferred are, the film material "Kapton," Type H (sold by Du Pont and made from the poly-condensation reaction between pyromellitic dianhydride and aromatic diamine). A further description of this film may be found in the article "H Film-A, New High Temperature Dielectric," by Leonard E. Amborski, appearing in I. & E. C. Product Research and Development, vol. 2, No. 3, September 1963, pp. 189–193.

Another film material which is preferred is a composite of Kapton-Type H and Teflon FEP (tetrafluoroethylene-hexafluoropropylene polymer) which is denoted as Kapton-Type HF film and sold by Du Pont. The addition of Teflon material is utilized to provide Kapton-Type H polyimide film with a heat-sealable surface and to permit successive layers of polyimide to be bonded together in a sandwich arrangement, if need be.

Other materials such as PI-1200 and the remainder of the family of chemicals denoted by the prefix PI (sold by Du Pont as a polyimide high temperature precursor solution) may also be utilized as the polyimide coating layer 12 or as an adhesive coating for Kapton-Type H polyimide film or the like to permit successive layers of H film to be bonded in a sandwich arrangement.

In addition to the above-noted polyimide coating materials, Pyre-ML (sold by Du Pont) and other coating materials such as disclosed in Patent No. 3,168,417 issued to R. E. Smith, Jr. and John M. Gardner, may also be used.

As the polyimide there can be used materials such as poly para-phenylene pyromellitimide, the polypyromellitimide prepared from 3,3'-diamino diphenyl and pyromellitic dianhydride, naphthylene polypyromellitimide (from 1,4-diamino naphthalene and pyromellitic dianhydride), the polypyromellitimide from benzidine and pyromellitic dianhydride, poly paraphenylene bis(1,1-dimethyl 5-pentamethylene) pyromellitimide, poly nonamethylene pyromellitimide, poly 4,4-dimethylheptamethylene pyromellitimide, poly 3-methylheptamethylene pyromellitimide, poly ethylene pyromellitimide, poly trimethylene pyromellitimide, poly o-xylylene pyromellitimide, poly p-xylylene pyromellitimide, poly m-xylylene pyromellitimide, poly 2,11-dodecylene pyromellitimide, the polymeric pyromellitimide from bis(gamma-aminopropyl) ether and pyromellitic diahnydride, the polymeric heterocyclic imide from 2,3,6,7-naphthalene tetracarboxylic dianhydride and p-phenylene diamine, the polymeric heterocyclic imide from 2,3,6,7-naphthalene tetracarboxylic dianhydride and benzidine, the polymeric heterocyclic imide from 3,3',4,4'-diphenyl tetra carboxylic dianhydride and m-phenylene diamine, the polybenzimidazole from 3,3'-diaminobenzidine and sebacic acid, the polybenzimidazole from 2,2-bis (3,4-diaminophenyl) propane and adipic acid, polybenzimidazoles having the formula

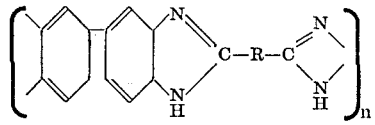

where R is

or

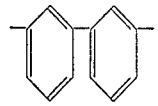

and $n$ is an integer of 30 or more. Usually, the polymer has a molecular weight of above 10,000.

Additional polybenzimidazoles includes poly-2,5(6)-benzimidazole of inherent viscosity 1.27; poly-2,2'-(tetramethylene)-5,5'-bibenzimidazole of inherent viscosity 3.19; the polybenzimidazoles from (1) a mixture of equal mols of 3,3'-diaminobenzidine and diphenyl pinate and having an inherent viscosity of 1.03, and (2) from 3,3'-diaminobenzidine and diphenyl homopinate, poly-2,2'-(m-phenylene)-5,5-bibenzimidazole having an inherent viscosity of 1.02 in 0.5% solution in dimethyl sulfoxide; poly-2,2'-(pyridylene-3",5")-5,5'-bibenzimidazole, inherent viscosity of 0.38 in 0.2% solution in dimethyl sulfoxide; poly-2,2'-(p-phenylene)-5,5'-bibenzimidazole having an inherent viscosity of 1.00; poly-2,2'-(furylene-2",5")-5,5'-bibenzimidazole having an inherent viscosity of 0.3 in 0.2% solution in dimethyl sulfoxide; polybenzimidazole from heating equal molar amounts of 3,3'-diaminobenzidine and diphenyl naphthalene-1,6-dicarboxylate, said product having an inherent viscosity of 0.86 in 0.2% solution in dimethyl sulfoxide; polybenzimidazole from 3,3'-diaminobenzidine and an equal molar amount of diphenyl biphenyl-1,8-dicarboxylate, said polymer having an inherent viscosity of 0.86 in 0.2% solution in sulfuric acid; polybenzimidazole from 3,3'-diaminobenzidine and an equal molar amount of diphenyl diphenate, said polymer having an inherent viscosity of 1.17 in 0.2% dimethyl sulfoxide; poly-2,6-(tetramethylene) - diimidazobenzene having an inherent viscosity of 2.51; poly-2,6-(m-phenylene)-diimidazobenzene having an inherent viscosity of 1.1; polymer from condensing equal molar amounts of dimethylisophthalate and 3,3' - diaminobenzidine, said polymer having an inherent viscosity of 0.46; the polymer from condensing equal molar amounts of isophthalic acid and 3,3'-diaminobenzidine, said polymer having an inherent viscosity of 0.68; polybenzimidazole by condensation of phenyl 3,4-diaminobenzoate with removal of the phenol formed; the polybenzimidazole made by reacting equal molar amounts of 1,2,4,5-tetraminobenzene with (a) dimethyl isophthalate, (b) dimethyl terephthalate, (c) 2,5-naphthalene dicarboxylic acid, (d) diphenyl 2,6-naphthalene dicarboxylate, (e) adipic acid, or (f) dimethyl 3,5-pyridine dicarboxylate; the polybenzimidazoles from reacting 2,3,6,7-tetramino naphtalene with an equal molar amount of (a) diphenyl terephthalate, (b) dimethyl adipate, (c) isophthalic acid, or (d) diphenyl sebacate; the polybenzimidazoles from condensing tetramino stilbene having the amino groups paired in ortho positions with an equal molar amount of (a) dimethyl terephthalate, (b) adipic acid, or (c) diphenyl isophthalate; the polymeric 6-membered heterocyclic ring compounds made by condensing 1,4,5,8-tetramino naphthalene with an equal molar amount of (a) diphenyl terephthalate, (b) dimethyl isophthalate, or (c) dimethyl adipate; the polymeric imides made by homopolymerizing (a) 4-amino phthalic anhydride or (b) 4,5-diamino phthalic anhydride. These polymers are made in known fashion, as shown in Vogel et al., Journal of Polymer Science, vol. 50, pp. 511–539 (1961), Edwards Patent 2,867,609, Edwards Patent 2,710,853, Edwards Patent 2,900,369 and Brinker Patent 2,895,948. The entire disclosures of the Edwards patents, Brinker and Vogel et al., are hereby incorporated by reference.

It is to be understood that the entire disclosures of the I. & E. C. Product Research and Development article, above mentioned, and Patent No. 3,168,417 are incorporated herein by reference thereto.

After the layer 12 is applied in the aforementioned manner, one or more protective covering layers are then applied over the polyimide layer 12. In the preferred embodiment, a single protective layer 13, comprising a polyimide type braid coated with a polyimide finisher, is preferred. It is to be understood that other protective layers, such as a woven textile or textile fiber in the form of a braid or jacket, may be used, wherein the textile is chosen from glass, quartz, asbestos, nylon, synthetics, or polyimide coverings and wherein the textile in the form of a braid is coated or impregnated with an organic compound such as silicone resin, fluorinated vinyl resin, polyimide precursors (unpolymerized polyimides) and varnishes.

While it will be understood that the wire dimensions may vary according to the design for any particular application, the following is a chart showing some of the dimensions of an insulated conductor constructed in accordance with the teachings of this invention:

Conductor 10—31 mil outside diameter stranded nickel-plated copper.
Layer 11—6 mil wall of glass-supported mica.
Layer 12—4 mil wall of Kapton-Type H polyimide film.
Layer 13—9 mil wall of polyimide braid.

It is to be understood that the above dimensions are illustrative only and are not to be considered as limiting the scope of this invention.

As a result of the teachings of this invention, it is now possible to construct a light-weight, abrasion-resistant, insulated wire which will withstand service in an open flame, at temperatures in excess of 1000° F. for extended periods of time. In particular, this invention accomplishes the above by utilizing the combination of an inorganic layer having properties which, when used in combination with a polyimide layer, provides these new and improved results.

What is claimed is:

1. A lightweight, small-diameter, abrasion-resistant, insulated electrical wire capable of withstanding service at temperatures above 650° F. and in a direct open flame at temperatures above 1,000° F. comprising in combination, a metallic conductor, a barrier layer on said conductor, said barrier layer selected from a class consisting of glass, quartz, glass-supported mica, quartz-supported mica, or asbestos, and a polyimide layer on said barrier layer, said polyimide layer comprising the polymeric reaction product of a pyromellitic dianhydride with an aromatic diamine.

2. An insulated electrical wire in accordance with claim 1, including a polyimide adhesive coating on said polyimide layer.

3. A lightweight, small-diameter, abrasion-resistant, insulated electrical wire capable of withstanding service at temperatures above 650° F. and in a direct open flame at temperatures above 1,000° F. comprising in combination, a metallic conductor, a barrier layer on said conductor, said barrier layer selected from a class consisting of glass, quartz, glass-supported mica, quartz-supported mica, or asbestos, and a layer on said barrier layer, said last-mentioned layer comprising a polyimide comprising the polymeric reaction product of a pyromellitic dianhydride with an aromatic diamine, said polyimide having tetrafluoroethylene-hexafluoropropylene thereon.

4. A lightweight, small-diameter, abrasion-resistant, insulated electrical wire capable of withstanding service at temperatures above 650° F. and in a direct open flame at temperatures above 1,000° F. comprising in combination, a metallic conductor, a barrier layer on said conductor, said barrier layer selected from a class consisting of glass, quartz, glass-supported mica, quartz-supported mica, or asbestos, and a polyimide layer on said barrier layer, said polyimide layer being selected from a group consisting of compounds having a member of the group consisting of benzene and naphthalene rings joined to two carbon atoms of a heterocyclic imide ring having 5 to 6 members in the ring, one to two of the atoms of the heterocyclic ring being nitrogen atoms and the balance of the atoms of the heterocyclic ring being carbon atoms.

5. A lightweight, small-diameter, abrasion-resistant, insulated electrical wire capable of withstanding service at temperatures above 650° F. and in a direct open flame at temperatures above 1,000° F. comprising in combination, a metallic conductor, a barrier layer on said conductor, said barrier layer selected from a class consisting of glass, quartz, glass-supported mica, quartz-supported mica, or asbestos, and a polyimide high-temperature film layer on said barrier layer.

6. A lightweight, small-diameter, abrasion-resistant, insulated electrical wire capable of withstanding service at temperatures above 650° F. and in a direct open flame at temperatures above 1,000° F. comprising in combination, a metallic conductor, a glass-supported mica layer on said conductor, and a polyimide fim layer on said glass-supported mica layer.

References Cited

UNITED STATES PATENTS

| | | | |
|---|---|---|---|
| 3,019,286 | 1/1962 | Andersson et al. | 156—56 X |
| 3,168,417 | 2/1965 | Smith et al. | 117—218 X |
| 3,190,770 | 6/1965 | Lavin et al. | 117—218 |
| 3,303,270 | 2/1967 | Shelton | 174—121 |
| 3,325,590 | 6/1967 | Westervelt et al. | 117—218 X |

WILLIAM D. MARTIN, *Primary Examiner.*

R. HUSACK, *Assistant Examiner.*

U.S. Cl. X.R.

117—217, 232, 75, 70, 71, 161; 156—56; 174—120, 121